Patented Sept. 16, 1930

1,775,644

UNITED STATES PATENT OFFICE

HANS KÄMMERER, OF MANNHEIM, AND KARL HOLZACH, OF LUDWIGSHAFEN-ON-THE-RHINE, GERMANY, ASSIGNORS TO GENERAL ANILINE WORKS, INC., OF NEW YORK, N. Y., A CORPORATION OF DELAWARE

CHROMIUM COMPOUNDS OF AZO DYES

No Drawing. Application filed February 17, 1928, Serial No. 255,177, and in Germany August 6, 1925.

We have found that the dyestuffs obtainable from o-hydroxydiazo compounds and 2.4-dihydroxyquinoline furnish complex chromium compounds of high commercial value. These chromium compounds may be produced, for example, by the action of solutions of chromium salts on the said di-hydroxyquinoline dyestuffs, with or without carrying out the operation at a pressure above atmospheric pressure. The resulting chromiferous dyestuffs are distinguished by their excellent fastness to washing, milling and light, and give red-brown, dark red, Bordeaux red or violet color shades according to the diazo components contained in the dyestuff. The dyeings may be discharged to a pure white with hydrosulphite and the dyestuffs are also suitable for printing on wool, silk and other fibers.

The following examples will further illustrate the nature of the said invention which however is not limited thereto. The parts are by weight.

Example 1

The azo dyestuff corresponding to the formula:

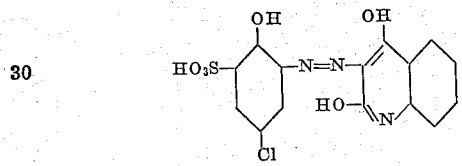

is prepared from 223 parts of diazotized 4-chlor-2-amino-phenol-6-sulfonic acid and 195 parts of 2.4-dihydroxyquinoline in any known or suitable manner and, after filtration, is stirred with 8000 parts of water in an enamelled pressure resisting vessel and heated at from 110° to 120° C. for 1½ hours with 120 parts of chromium oxid and 270 parts of an 85 per cent solution of formic acid. The finished chromium compound is salted out, dissolved in 500 parts of water containing 140 parts of 40° Bé. caustic soda solution and reprecipitated with common salt. The resulting sodium salt of the dyestuff is filtered, pressed and dried. The dyestuff is in the form of a dark red powder, which dissolves to a brownish-orange solution in sulfuric acid, and to a cherry red solution in water. The free acid of the dyestuff may be obtained in the form of small bronzy crystals from the dilute alcoholic solution of the sodium salt by treatment with hydrochloric acid.

On wool, the dyestuff gives Bordeaux red dyeings in an acid bath, which are very fast to washing, milling and light.

Example 2

383 parts of the sodium salt of the azo dyestuff corresponding to the formula:

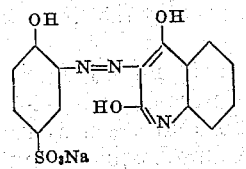

and obtainable from diazotized 2-aminophenol-4-sulfonic acid and 2.4-dihydroxyquinoline are stirred with 7000 parts of water and mixed with a solution of chromium formate which corresponds to 80 parts by weight of chromium oxid. The mixture is heated in an enamelled pressure tight vessel for from 1 to 2 hours to about 120° C. and then cooled. The finished chromium compound of the dyestuff is salted out and filtered whereupon it is converted into the readily soluble sodium salt by treating it with soda or caustic soda solution, and recovered as described in Example 1. The new dyestuff obtained is a brownish powder which dissolves in water to a red solution and dyes wool very fast dark red shades from an acid bath.

The complex chromium compound of the dyestuff corresponding to the formula:

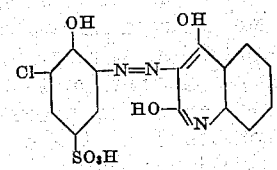

and obtainable in a similar manner from 6- chlor-2-aminophenol-4-sulfonic acid and 2.4-dihydroxyquinoline dyes orange red shades on wool.

Example 3

428 parts of the sodium salt of the dyestuff corresponding to the formula:

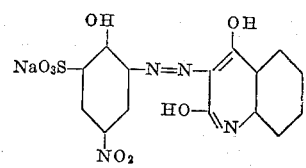

and obtainable from diazotized 4-nitro-2-aminophenol-6-sulfonic acid and 2.4-dihydroxyquinoline are heated in a closed vessel with 8000 parts of water and a solution of 100 parts of chromium oxid and 230 parts of 85 per cent formic acid in boiling water for from 2 to 3 hours to from 110° to 120° C. After that time the mixture is cooled and the separation of the dyestuff is completed by adding common salt. The product is filtered off and converted into its sodium salt as is described in Example 1. The red powder obtained dissolves readily in water to a yellow red solution which color is changed to red by adding a mineral acid. The new dyestuff dyes wool very even and bright red shades which are excellently fast to light and washing.

The chromium compound of the azo dyestuff obtainable from 6-nitro-2-aminophenol-4-sulfonic acid and 2.4-dihydroxyquinoline and corresponding to the formula:

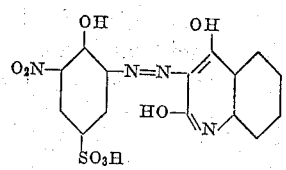

prepared in an analogous manner dyes wool red shades with a more bluish tinge and of similar properties as regards fastness.

This application is a continuation in part of our copending application Ser. No. 124,776, filed July 24, 1926, in which we have generically shown that it is of great advantage to produce chromium compounds of o-hydroxy-azo dyestuffs by carrying out the chromation under elevated pressure.

What we claim is:

1. As new articles of manufacture the chromium compounds of the o-hydroxyazo dyestuffs obtainable from o-hydroxydiazo compounds and 2.4-dihydroxyquinoline dyeing very fast red to brown and violet shades.

2. As a new article of manufacture the chromium compound of the o-hydroxyazo dyestuff obtainable from diazotized 4-chloro-2-aminophenol-6-sulfonic acid and 2.4-dihydroxyquinoline corresponding to the formula:

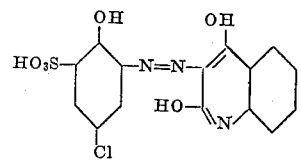

dyeing very fast Bordeaux red shades on wool and dissolving to a brownish-orange solution in sulfuric acid and to a cherry red solution in water.

In testimony whereof we have hereunto set our hands.

HANS KÄMMERER.
KARL HOLZACH.